(12) United States Patent
Flint (10) Patent No.: US 10,415,611 B2
(45) Date of Patent: Sep. 17, 2019

(54) RETAINING ELEMENT

(71) Applicant: Sören Flint, Weisswasser (DE)

(72) Inventor: Sören Flint, Weisswasser (DE)

( * ) Notice: Subject to any disclaimer, the term of this patent is extended or adjusted under 35 U.S.C. 154(b) by 61 days.

(21) Appl. No.: 15/576,731

(22) PCT Filed: May 26, 2016

(86) PCT No.: PCT/DE2016/100244
§ 371 (c)(1),
(2) Date: Nov. 24, 2017

(87) PCT Pub. No.: WO2016/188519
PCT Pub. Date: Dec. 1, 2016

(65) Prior Publication Data
US 2019/0010968 A1 Jan. 10, 2019

(30) Foreign Application Priority Data

May 27, 2015 (DE) .................... 20 2015 102 745 U
Jan. 27, 2016 (DE) .................... 20 2016 100 388 U (51) Int. Cl.
| | |
|---|---|
| *F16B 2/22* | (2006.01) |
| *F16B 7/04* | (2006.01) |
| *F16L 3/13* | (2006.01) |
| *F16L 3/22* | (2006.01) |
| *F16L 3/16* | (2006.01) |
| *F16L 3/223* | (2006.01) |

(Continued)

(52) U.S. Cl.
CPC .................. *F16B 2/22* (2013.01); *F16B 7/04* (2013.01); *F16L 3/13* (2013.01); *F16L 3/16* (2013.01); *F16L 3/22* (2013.01); *F16L 3/223* (2013.01); *F16L 3/237* (2013.01); *F16B 2/16* (2013.01); *F16B 7/0433* (2013.01); *F16B 7/0493* (2013.01); *F16B 9/023* (2013.01); *Y10T 24/3444* (2015.01)

(58) Field of Classification Search
CPC ............. Y10T 24/3726; Y10T 24/3787; Y10T 24/344; Y10T 24/3444; F16B 2/16; F16B 2/22; F16B 7/04; F16B 7/0493; F16B 7/0433; F16B 9/023; F16L 3/22; F16L 3/223; F16L 3/16; F16L 3/13; F16L 3/237
See application file for complete search history.

(56) References Cited

U.S. PATENT DOCUMENTS

| | | | |
|---|---|---|---|
| 4,655,424 A | 4/1987 | Oshida | |
| 4,858,285 A * | 8/1989 | Dala | A47C 1/14 24/555 |

(Continued)

FOREIGN PATENT DOCUMENTS

| | | |
|---|---|---|
| DE | 8414242 U1 | 9/1984 |
| DE | 4228305 A1 | 3/1994 |

*Primary Examiner* — Robert Sandy
(74) *Attorney, Agent, or Firm* — Michael Soderman (57) ABSTRACT

The holding element consists of at least one holding unit (1), consisting of at least two holding fingers (3) connected with each other on one side at a connecting point (2) and where at the connecting point (2) opposite the holding fingers (3) it has a fastening unit (10) or instead of the fastening unit (10) another holding unit (1) is arranged, where this holding unit (1) likewise consists of at least two holding fingers (3) connected on this side with each other at a connecting point (2) and all holding fingers (3) are preferably fitted with a spherical end (4).

8 Claims, 10 Drawing Sheets

(51) Int. Cl.
*F16L 3/237* (2006.01)
*F16B 2/16* (2006.01)
*F16B 9/02* (2006.01)

(56) References Cited

U.S. PATENT DOCUMENTS

| | | |
|---|---|---|
| 5,323,992 A | 6/1994 | Sifers et al. |
| 2013/0094164 A1 | 4/2013 | Tsutsumi |
| 2015/0053294 A1 | 2/2015 | Cooke et al. |

* cited by examiner

RETAINING ELEMENT

CROSS REFERENCE TO RELATED APPLICATIONS

This application is the U.S. national stage of International Application No. PCT/DE2016/100244, filed on 2016 May 26. The international application claims the priority of DE 202015102745.1 filed on 2015 May 27 and the priority of DE 202016100388.1 filed on 2016 Jan. 27; all applications are incorporated by reference herein in their entirety.

BACKGROUND

The invention concerns a holding element that is used to join two or several objects. In particular, the holding element is used to fasten a mobile object to a stationary object.

The invention provides a holding element with at least one holding unit consisting of holding fingers. At this, in addition to holding fingers with spherical ends, the holding unit may also have holding fingers without spherical ends. In addition, holding elements are provided where the holding units with holding fingers are combined with other fastening units, such as suction cups, hooks, eyes, rings, loops, clips, screw clamps, clamps, magnets, hook-and-loop fasteners, retaining plates, click-on connections or screw connections.

Holding elements are known in different designs. They preferably consist of elastic plastic or metal and are commonly used to mount pipes or hoses. For instance, DE 1813029 U1 features a double clamp turned by 90 degrees. DE 19955654 A1 discloses a twistable double clamp which enables a different orientation of the objects to be connected.

DE 202004000120 U1 introduces, for example, a hose holder to be clamped on a container edge.

Moreover, burette clamps with three holding fingers are known, where two of the holding fingers are rigidly connected with each other.

SUMMARY

The object of the invention is to provide a universally usable and cost-effective holding element. The holding element shall consist of components that allow for its modification and, in so doing, provide a wide range of holding element designs. The holding elements shall have a variable design and thus be useful for a wide range of applications.

The holding element according to the invention consists of at least one holding unit (1), consisting of at least two holding fingers (3) connected with each other on one side at a connecting point (2) and where at the connecting point (2) opposite the holding fingers (3) it has a fastening unit (10) or instead of the fastening unit (10) another holding unit (1) is arranged, where this holding unit (1) likewise consists of at least two holding fingers (3) connected on this side with each other at a connecting point (2) and all holding fingers (3) are preferably fitted with a spherical end (4).

DETAILED DESCRIPTION

The object of the invention is to provide a universally usable and cost-effective holding element. The holding element shall consist of components that allow for its modification and, in so doing, provide a wide range of holding element designs. The holding elements shall have a variable design and thus be useful for a wide range of applications.

According to the invention, the task is solved with the characteristics of the main claim.

The invention solves the task with the characteristics of the main claim and of the ancillary claim. The holding element comprises at least two interconnected holding units or one holding unit with a fixing unit docked onto it. The holding units serve to receive the respective object whose shape in this area is stretched lengthwise, such as a cylindrical shape, for instance. This way, the objects to be connected could be stems, rods, hoses, pipes, pins and also slabs, for example. The holding units consist of at least two holding fingers which are interconnected on one side at a connection point and encompass the objects to be clamped. Preferably, the end of the holding finger is implemented in a spherical form respectively. Besides spheres, spherical form also includes, for instance, ellipsoids, spherical segments, cylinders and other forms with convex surfaces.

The spherical form enhances encompassing of the objects to be clamped. At the same time, the spherical form facilitates the introduction of the object into the respective holding unit. Moreover, the spherical form prevents the object to be held from slipping out.

In a variant, the holding element consists of at least one holding unit. The holding unit consists of at least two holding fingers interconnected on one side at a connection point, whereby at least one holding finger is equipped with a spherical end and at least another holding finger is designed without a spherical end. The holding unit then has the advantage of being designed with a through hole for receiving a fixing unit. This fixing unit may serve to fix the holding unit to an object and an object can be hooked or fixed to this fixing unit.

The invention also includes holding units for which only one holding finger is equipped with a spherical end which, for example, pressing the object to be clamped against a second holding finger without spherical end and, in so doing, holds the object.

Other advantageous design of the invention are disclosed in the sub-claims. According to a beneficial further design, the holding elements are made of an elastic material such as rubber or elastic plastic. Thanks to the elastic design, the objects can be pressed from the open side between the retreating holding fingers which then move back in the direction of their starting position.

According to a further design of the invention, spherical ends are connected with the holing fingers in a detachable manner. The detachable connection also allows connecting the objects in case of a rigid version of the holding elements. After introduction of the object between the holding fingers, the spherical ends are fixed to the latter and thus prevent the object from detaching from the holding unit.

According to a suitable design, the holding fingers have a curved shape, whereby the gap between the holding fingers and the connection point initially increases. Thanks to a compatible section, this design provides the appropriate space for objects with round cross-section to be received by the holding element.

According to a further design of the invention, at least one of the holding units consists of three holding fingers. Three holding fingers allow fixing an object, for example, with a cylindrical section or a plate, whereby the appropriately designed holding unit allows for a certain resistance against turning of the object around the holding element.

According to the design of the invention, at least one of the holding units consists of four holding fingers. Two objects can therefore be fixed, where again there is stoppage against distortion. With these designs with three or four holding fingers, e.g. as partially shown in the figures, crossing bars can be connected with each other or held against each other.

The formulation "at least of one of the holding units", indicates that a holding element may combine holding units with a different number of holding fingers in itself. Holding elements can therefore be designed in different useful combinations, such as with two/three holding fingers or three/three or two/four holding fingers.

According to an advantageous further design of the invention, the holding units are arranged opposite of each other. This most common design allows realizing diverse connections between two objects toward each other.

According to a design of the invention, the holding units are arranged at an angle toward each other. This allows designing useful three-dimensional connections between accordingly arranged objects.

Due to the fact that with three or four holding fingers per holding unit, the objects can be introduced in different ways between the holding fingers, manifold options of arranging the objects toward each other are provided. At this, the objects may also be aligned differently.

According to a beneficial further design of the holding unit, the holding fingers of the holding unit are arranged on the same plane. This allows, for example, connecting objects aligned toward each other in parallel.

According to a useful design of the holding element, the holding fingers of the holding units are arranged on different planes. A place results from the position of the holding fingers of a holding unit toward each other. As a result of the different planes of the holding fingers, different object planes are produced for the objects to be held. Accordingly, objects can be connected with each other on different planes.

According to a beneficial further design, the holding fingers feature one, two or several bulges. Longer holding fingers, intended to include several objects in a holding unit, may feature one or several bulges along their longitudinal extension. These bulges form a resistance against loosening of the individual elements to be held.

According to a beneficial further design, the holding finger/s without spherical end feature at least one plane contact face. The contact face is used for the object to rest against the holding finger. Holding of the object is achieved by the spherical end on one holding finger. The plane contact face of the holding finger without spherical end causes a certain alignment of the object/s to be held, which depends on the contact pressure of the holding fingers against the contact face.

With another beneficial version of the invention, the holding unit is connected with a fastening unit. At this, the fastening units may be formed, for example, as suction cups, hooks, eyes, rings, loops, clips, screw clamps, clamps, magnets, hook-and-loop fasteners, retaining plates, click-on connections or screw connections, It is therefore possible to combine the holding unit with conventional fastening units. Accordingly, the respective best fastening or holding unit for locking the respective objects can be combined with each other and respectively different holding units adapted to the intended uses can be formed accordingly. Furthermore, it is conceivable that the fastening unit is designed detachable from the holding unit and is replaced by another fastening unit. Suction cups allow attaching the holding element to smooth surfaces. Using screws directly, or in connection with holding plates, the holding elements can be fastened on corresponding objects by screw connections. Hooks, eyes, rings, loops and clips are suitable to fastening corresponding objects to the holding element. Likewise, clips, screw clamps, clamps, magnets, hook-and-loop fasteners and click-on connections offer many options of connecting the holding elements with or to one corresponding objects.

BRIEF DESCRIPTION OF THE DRAWINGS

Advantageous design examples of the invention are explained in detail based on drawings.

The following is shown.

DETAILED DESCRIPTION OF THE PREFERRED EMBODIMENTS

Figure 1:
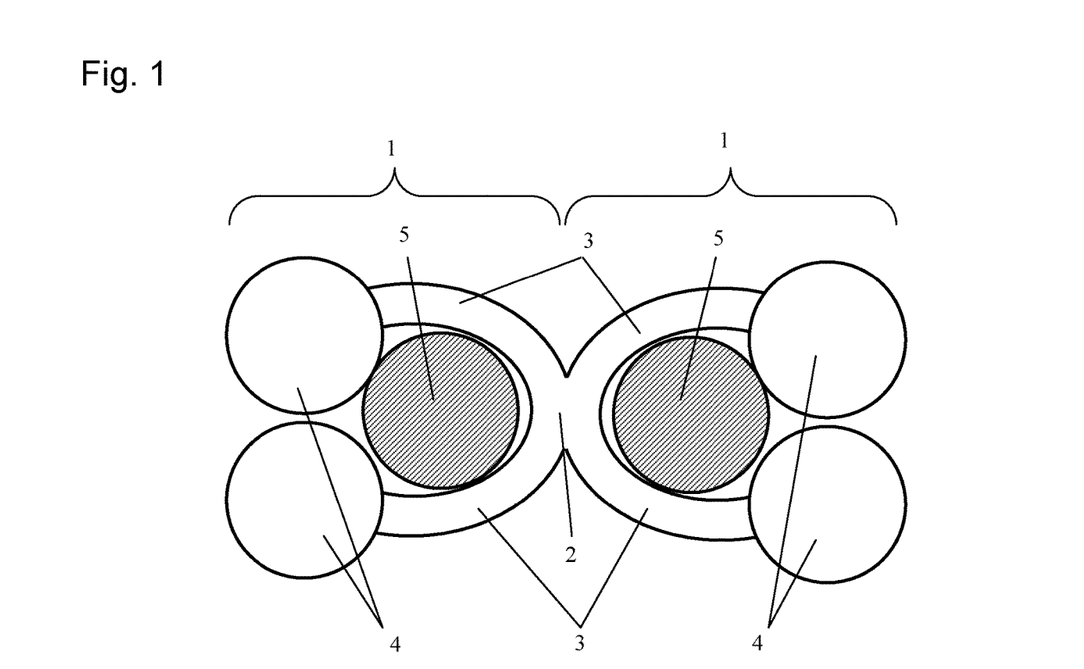
FIG. 1 a holding element designed as double clamp.

FIG. 1 shows a holding element designed as simple double clamp. The two holding units 1 each hold an object 5 with circular cross-section. Holding units 1 consist here each of two holding fingers 3, which are connected at the connecting point 2 with each other and here again also with the opposite holding element 1. Holding fingers 3 end with a spherical end 5. The object 5 is surrounded/enclosed each by holding fingers 3 and spherical ends 5. Here, holding fingers 3 of both holding units 1 are arranged on the same plane resulting in the position of the objects 5 on the same plane.

The figure descriptions below each emphasize the differences to the basic design described in FIG. 1 and therefore refer to them.

Figure 2:
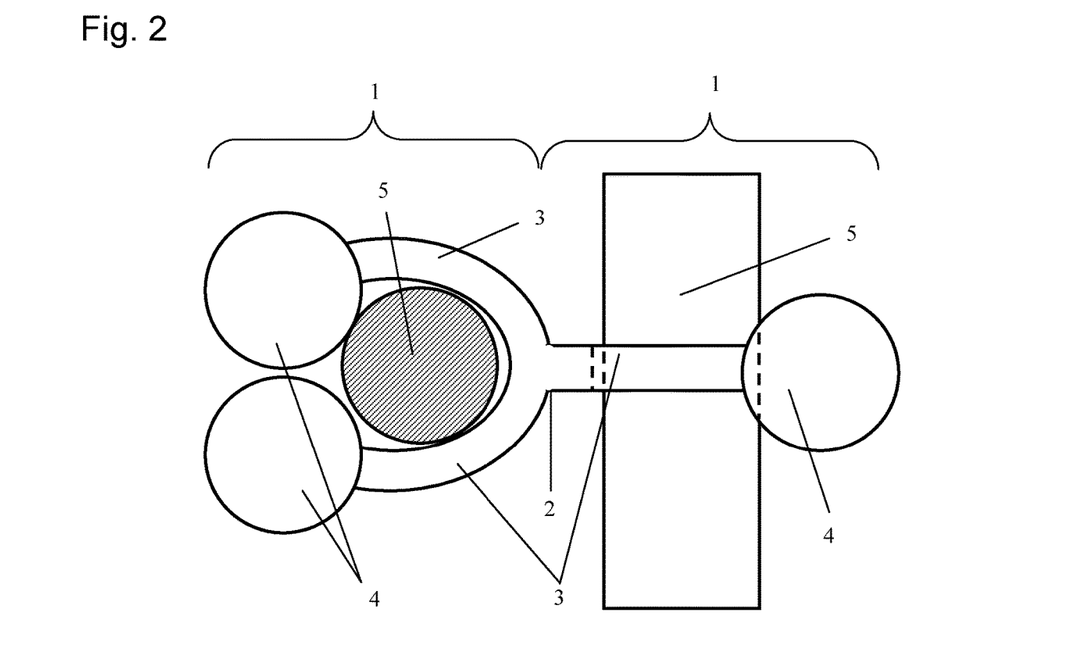
FIG. 2 a holding element designed as double clamp with different holding planes, FIG. 3 a holding element with holding units arranged at angles, FIG. 4 a holding unit with three holding fingers in top view, plugged onto a plate, FIG. 5 a holding element with a holding unit of two holding fingers combined with a holding unit of three holding fingers.

FIG. 2 shows a holding element designed as double clamp with different holding planes. The presentation of holding unit 1 shown at the left agrees with the holding unit 1 shown in FIG. 1. The holding unit 1 presented at the right is also identical with the holding units from FIG. 1. The difference is that the right holding unit is turned by 90 degree against the left holding unit 1. The holding planes are produced by the position of the holding fingers 3 toward each other. From the holding fingers 3 turned by 90 degree toward each other a rotation of the two objects 5 by 90 degree toward each other is produced.

Figure 3:
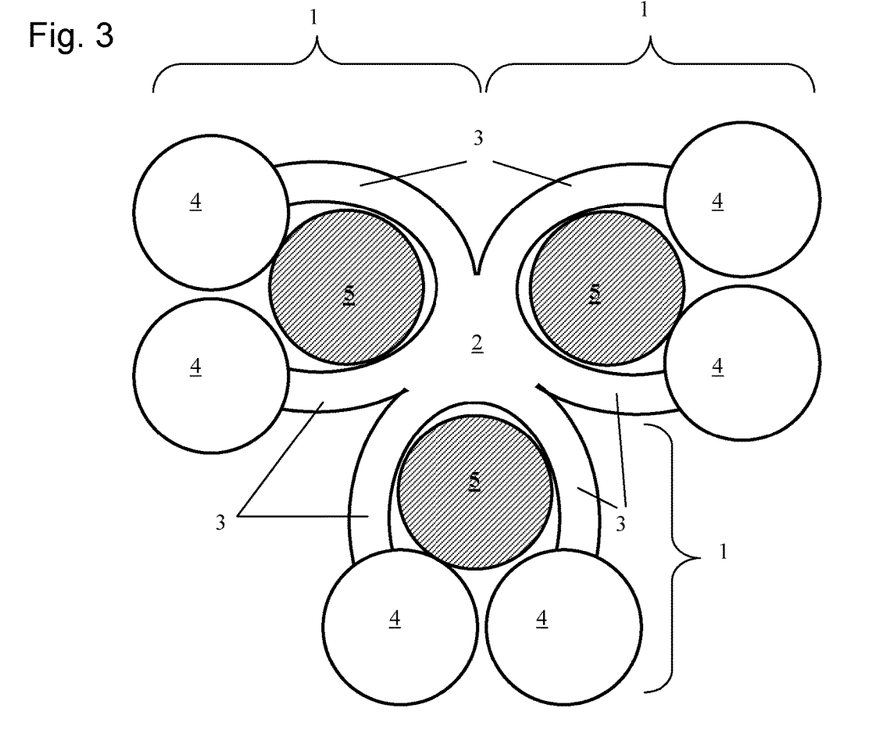

In FIG. 3 a holding element with holding units 1 arranged at an angle toward each other is shown. The holding unit 1 shown below is shown at a right angle to the two opposing holding units 1 shown above. According to one design, holding units 1 may also be designed turned toward each other. Likewise, holding units 1 may be connected with each other at different points.

Figure 4:
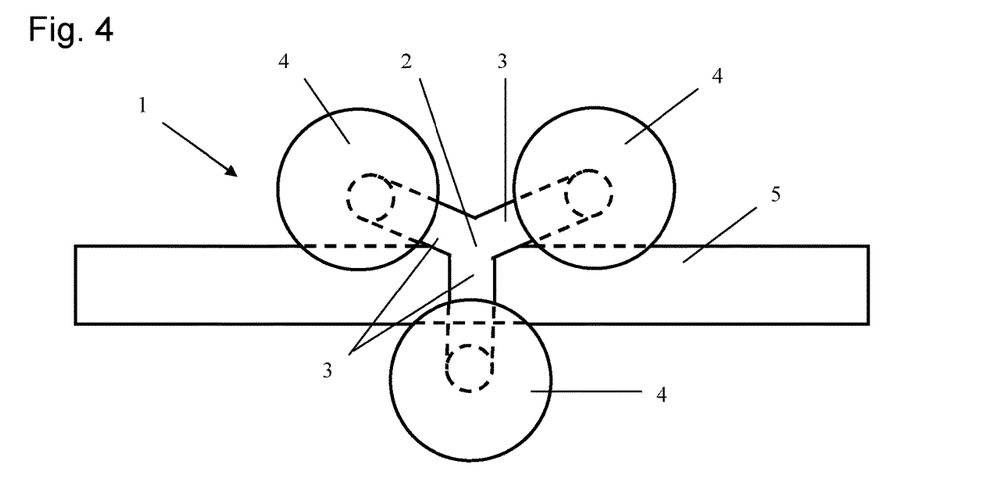

FIG. 4 shows holding unit 1 of a holding element with three holding fingers 3 from the top. Holding fingers 3, originating from the connection point, are arranged toward each other at an angle of 120 degree. Likewise, an object 5 clamped into the holding unit 1 is shown. In that object 5 rests on one side against two holding fingers 3 with spherical end and pressed against the same through its elastic design by the holding finger 3 arranged on the opposite side and shown below, there is an increased resistance against the turning of object 5 with reference to holding unit 1. It becomes apparent here that object 5 can be introduced into holding unit 1 in three different orientations.

Figure 5:
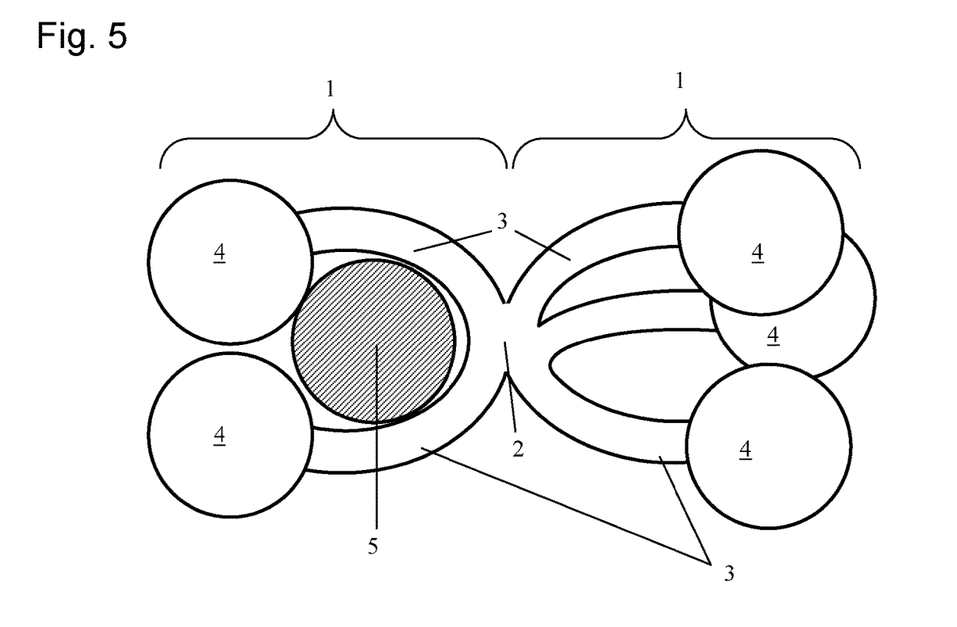

In FIG. 5, a holding element with a holding unit 1 of two holding fingers 3 on the left side and one holding unit 1 of three holding fingers 3 at the right side is shown. This provides a perspective presentation of a holding element, consisting of a combination of the designs with two holding fingers 3 and three holding fingers, as shown in FIG. 1 and FIG. 3.

Figure 6:
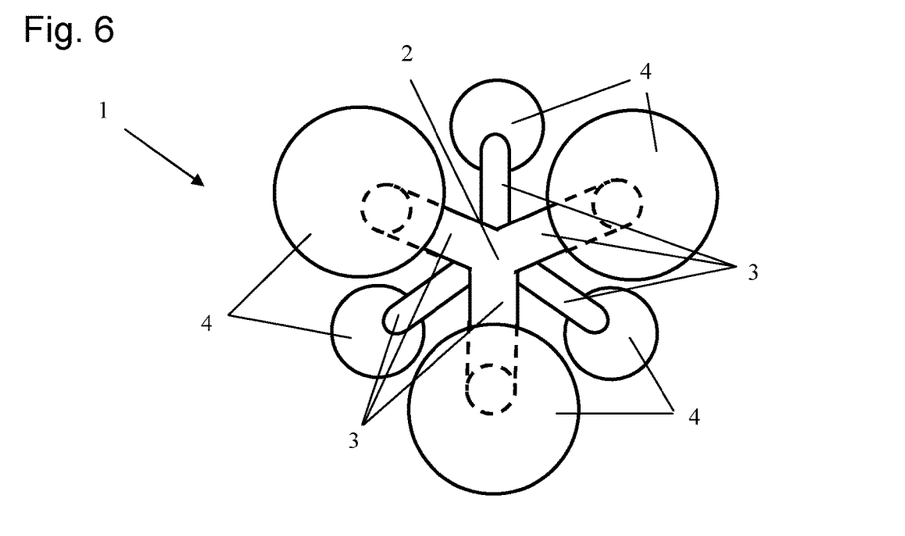
FIG. 6 a holding element with two times three holding fingers on different planes, FIG. 7 a holding element in top view with four holding fingers and objects introduced crosswise, FIG. 8 a holding element in top view with four holding fingers and objects introduced in parallel and FIG. 9 a perspective presentation of a holding element with two holding units featuring two and four holding fingers, FIG. 10 a holding finger with bulges FIG. 11 a holding element with suction cup, FIG. 12 a holding element with threaded pin, FIG. 13 a holding element with suction cup on one holding finger, FIG. 14 a holding unit with four holding fingers in top view, FIG. 15 a holding unit with five holding fingers, FIG. 16 a holding unit with three holding fingers with a through hole with female thread in the area of the connecting point and FIG. 17 a holding unit with three holding fingers with a through hole in the area of the connecting point.

FIG. 6 shows a holding element with three holding fingers 3 on both sides in a top view. For better distinction, holding fingers 3 and the spherical ends 4 are shown smaller in the background. Due to the different orientations of the holding fingers 3 in the foreground and in the background, the objects (not shown) can be aligned on different planes. Of course, the holding elements may be designed so that the holding fingers 3 have a different size regarding length and the spherical ends 4 may have a different size.

Figure 7:
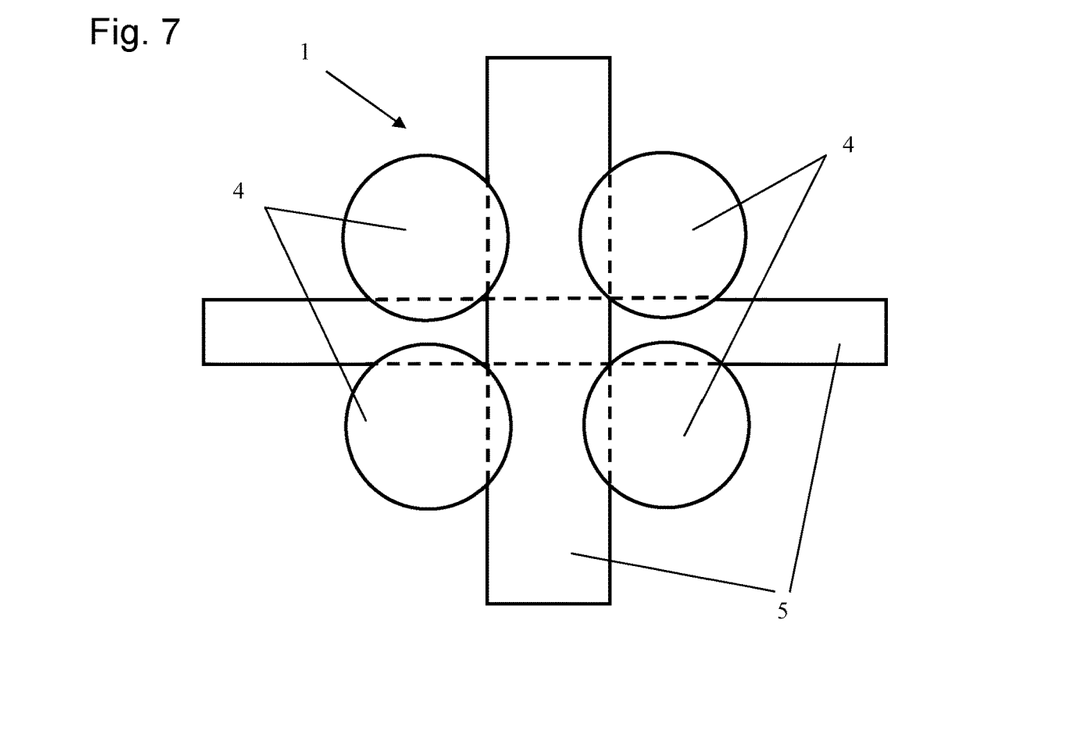

FIG. 7 shows a holding unit 1 with four holding fingers (cannot be seen) from the top. The objects 5 introduced between the holding fingers with the spherical ends are positioned here crosswise on top of each other in holding unit 1.

Figure 8:
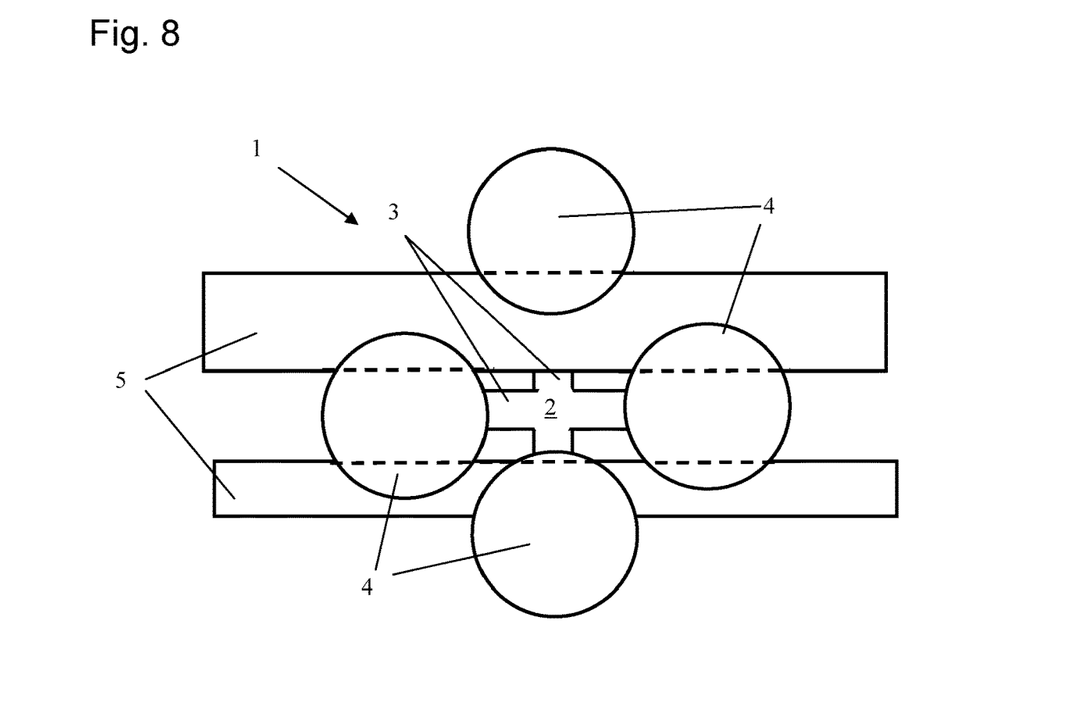

In FIG. 8, a holding unit 1 as known from FIG. 7 with four holding fingers 3 is shown. Here, the rod-shaped objects 5 are clamped in parallel between the holding fingers 3 with the spherical ends 4.

Figure 9:
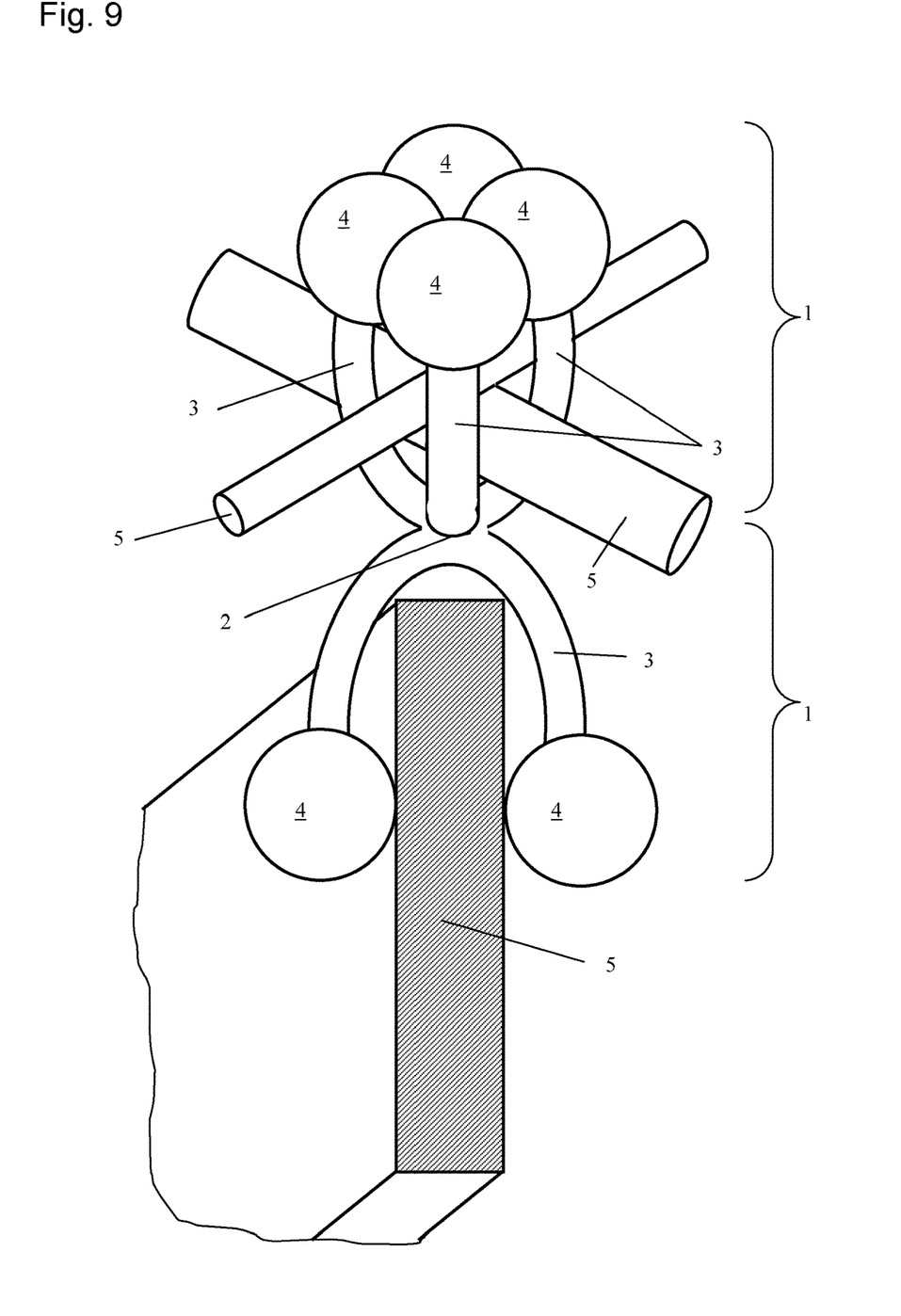

FIG. 9 shows a perspective presentation of a holding element with two holding units 1. The lower holding unit 1 comprises two holding fingers 3 with spherical ends 4. Holding fingers 3 are clamped here to a plate-shaped object 5, for example, a table top. The opposing four holding fingers 3 surround two objects 5 designed as round rods, arranged crosswise toward each other, as also shown in FIG. 7.

Figure 10:
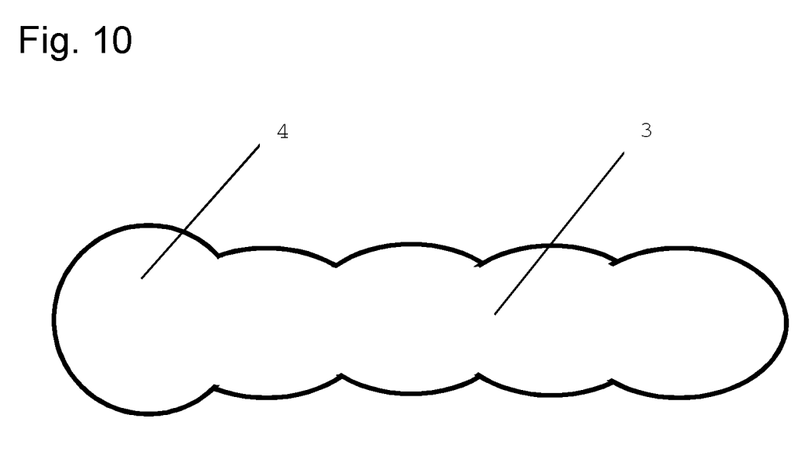

The holding fingers 3 may also have bulges distributed over their length, as shown in FIG. 10. These bulges allow for a certain engagement when pushing on the holding elements.

Figure 11:
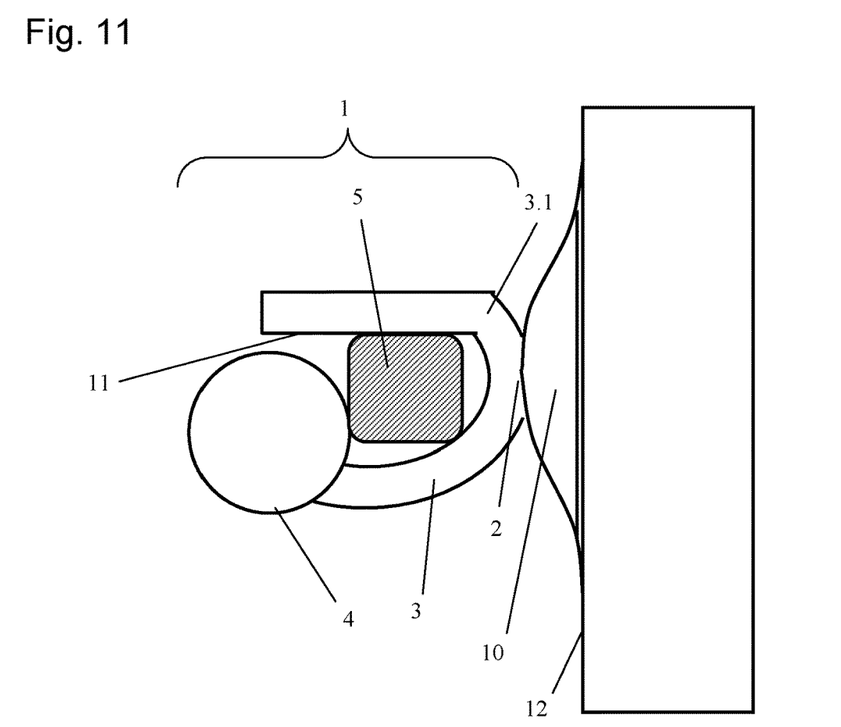

FIG. 11 shows a holding element with a suction cup 10 as fastening unit 10. The suction cup 10 is especially suitable to fastening the holding element through a vacuum to a smooth surface 12, such as to a wall tile. At the connection point 2 of holding fingers 3, 3.1 of the holding unit 1, they are connected with suction cup 10.

The two holding fingers 3, 3.1 of the holding element 1 have different designs. One holding finger 3 has a spherical end 4. The second opposite holding finger 3.1 is designed without spherical end 4 and forms, for example, a plane contact face 11 for object 5 to be held. By object 5 resting against the plane contact face 11, object 5 can be aligned. This design is therefore especially suitable for objects 5 with a two-dimensional boundary.

Figure 12:
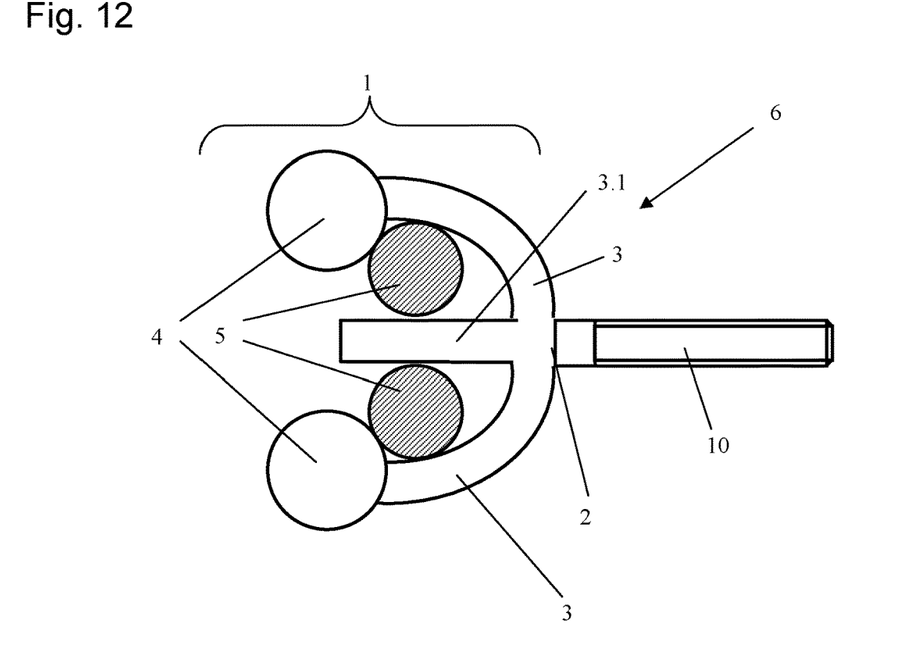

FIG. 12 shows a holding element with a threaded pin 10 as fastening unit 10. With the threaded pin 10, a screw connection for fastening to another component can be realized. For example, fastening with an anchor (not shown) in a wall is possible. Holding unit 1 is designed here with three holding fingers 3, 3.1 where the upper and lower holding fingers 3 have a spherical end 4 and the middle holding finger 3.1 is designed without spherical end 4.

Figure 13:
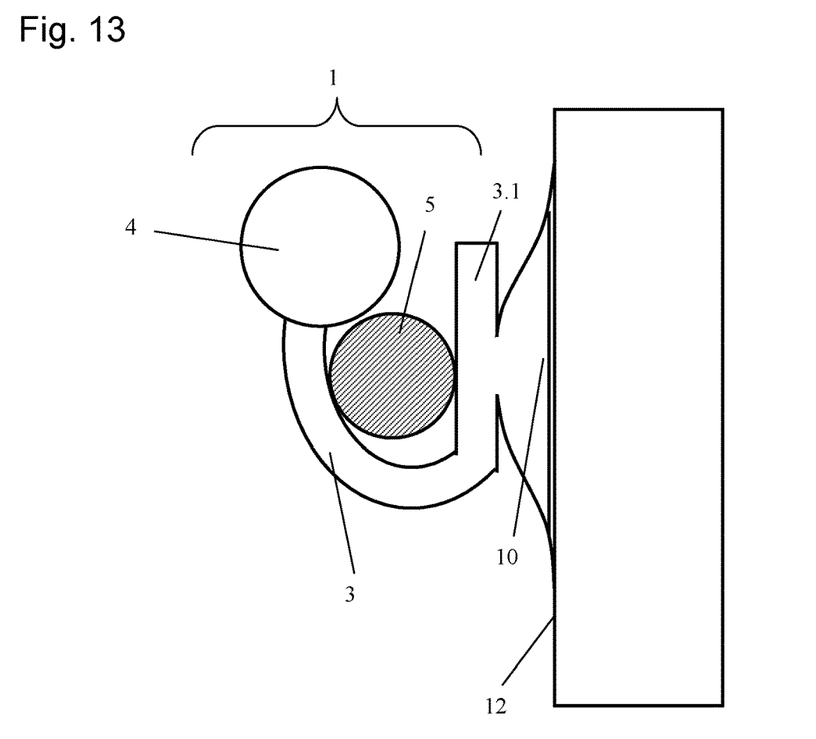

In FIG. 13, a holding element derived from FIG. 11, with a suction cup 10 fastened to one holding finger 3, is shown. Thus, the connecting point 2 toward the fastening unit 10 is arranged on holding finger 3.1 without spherical end.

Figure 14:
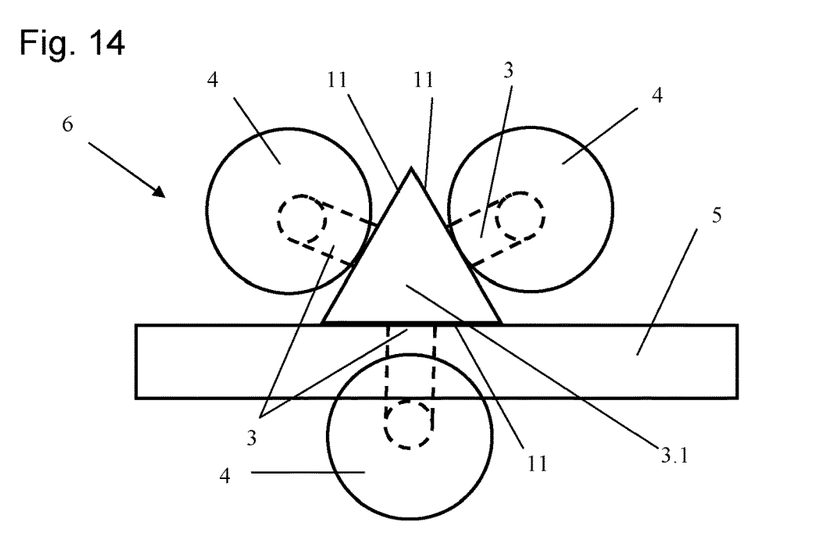

FIG. 14 shows a holding unit 1 with four holding fingers 3, 3.1 in top view. The middle holding finger 3.1 without spherical end is designed with triangular cross-section and plane contact faces 11. Here, the plane contact faces 11 allow for an alignment of objects 5 at an angle of 120 degree toward each other.

Figure 15:
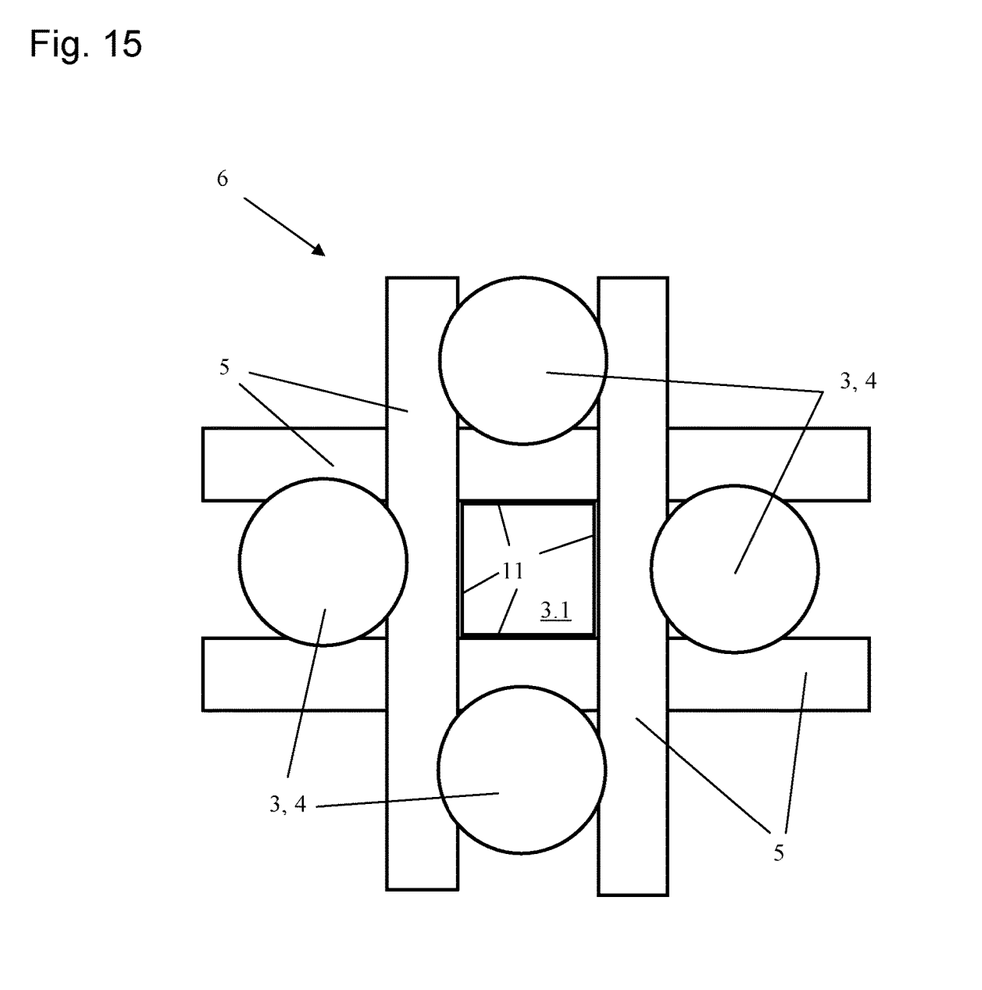

FIG. 15 shows a holding unit 1 with five holding fingers 3, 3.1. The centrally arranged holding finger 3.1 without spherical end features a square cross-section with corresponding plane contact faces 11. Thus, the objects 5 to be held can be arranged at an angle of 90° toward each other. Altogether four objects 5 are held here, where two objects 5 each are aligned in parallel toward each other.

Figure 16:
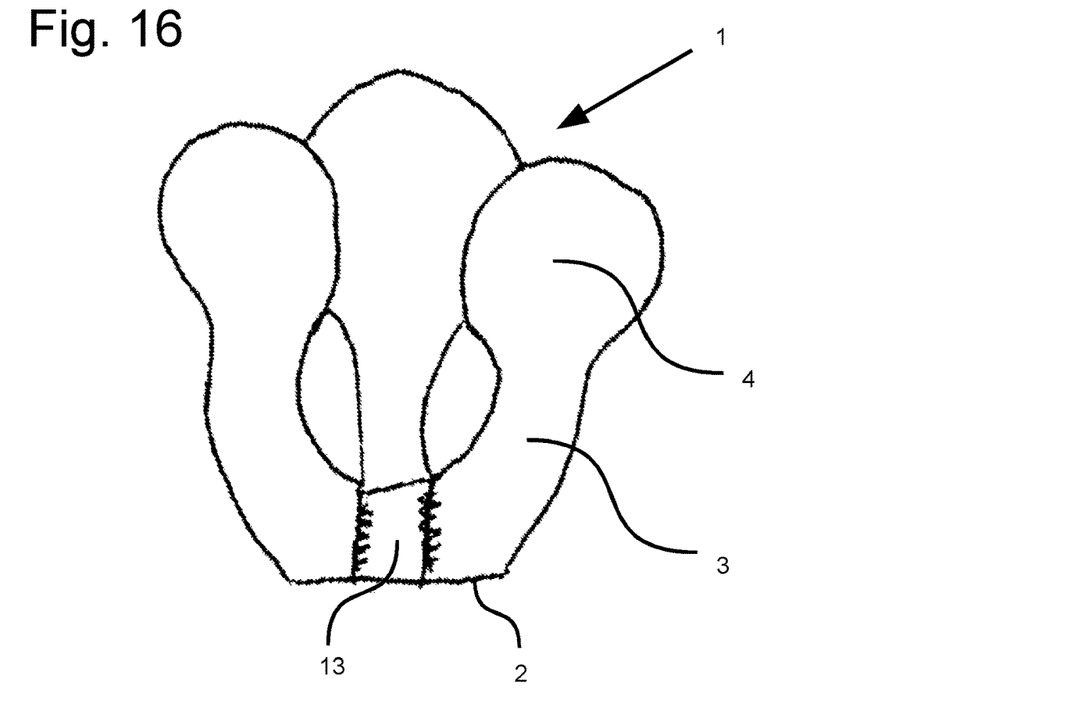
Figure 17:
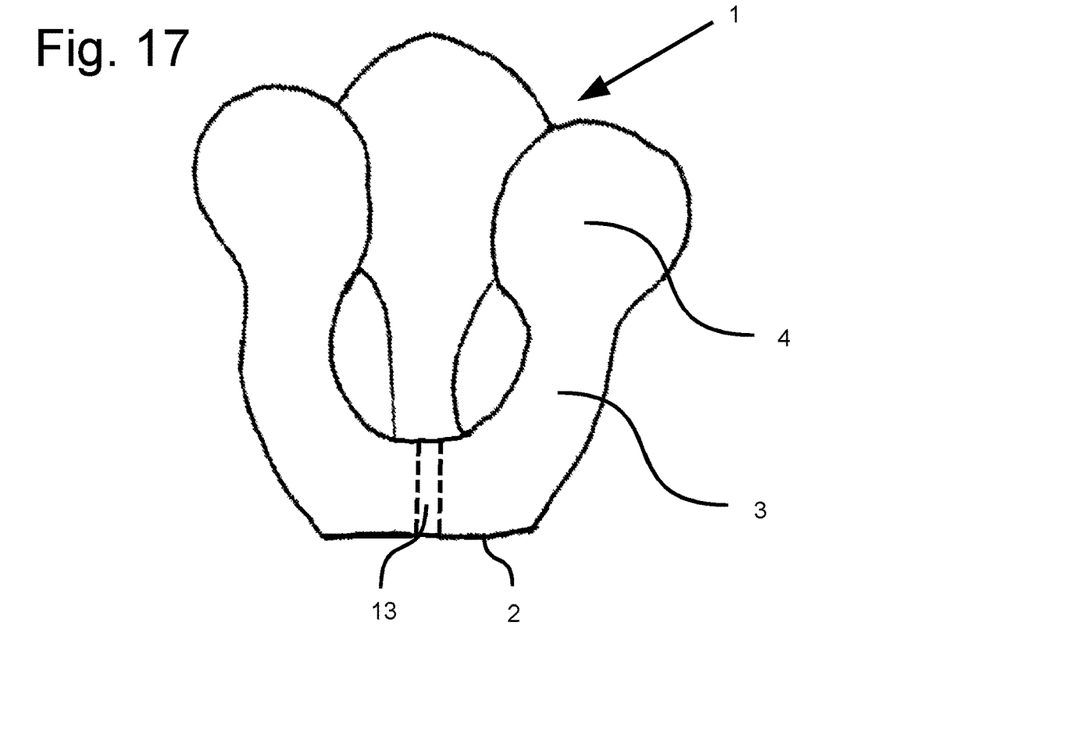

In FIGS. 16 and 17, the holding units 1 in the area of the connecting point 2, that is, in the area of fastening of the holding fingers 3, feature a through hole 13, with or without thread, with a variety of different diameters. This through hole 13 may be used, on the one hand, to fasten holding unit 1 to objects 5, such as walls, boards, beams, etc. with screws or nails. With the design variant with a through hole 13 with female thread, object 5 may also have a threaded rod and thus enabling a secure connection. However, through hole 13 with female thread can also accommodate fastening elements such as hooks with a threaded end. In this case, holding fingers 3 with the spherical end 4 serve to fasten the holding unit 1 to an object 5 and, for example, the hook for hanging up objects.

However, it is also conceivable that two holding elements 1 according to FIG. 16 are connected with each other with a rod, featuring a matching thread on both ends for the threaded hole 13 thus forming one complete holding element with two holding units. The rod may also be designed here as telescopic rod or only as connecting pin with thread. However, this design can be used, for example, also as holding element on a ground anchor. For this purpose, the ground anchor only needs to have a matching threaded pin as connecting element to the holding element. A possible application would be, for example, a sprinkler system in the garden, that can be easily repositioned at a different location in the garden.

The figures presented show by way of example the manifold design variants of the holding elements and holding units and their diverse application options.

LIST OF REFERENCE NUMERALS

1—Holding unit
2—Connecting point
3—Holding finger 3.1—Holding finger without spherical end
4—Spherical end, ball
5—Object
6—Holding element
10—Fastening unit, suction cup, threaded pin
11—plane contact face
12—smooth surface
13—Through hole, threaded hole

The invention claimed is:

1. A holding element, comprised of a first holding unit (1), made up of at least three holding fingers (3) connected with each other on one side at a connecting point (2) and where at the connecting point (2) opposite the holding fingers (3) a fastening unit (10) is arranged or comprised of a first holding unit (1) made up of at least two holding fingers (3) connected with each other on one side at a connecting point and instead of the fastening unit (10) a second holding unit (1) is arranged, where this second holding unit (1) likewise consists of at least two holding fingers (3) connected on this side with each other at a connecting point (2) and the first holding unit (1) and the second holding unit are arranged opposite of each other or at an angle toward each other and all holding fingers (3) are fitted with a spherical end (4), ellipsoid, spherical segment or cylinder.

2. The holding element according to claim 1, characterized in that
the fastening unit (19) is designed as a suction cup, hook, eye, ring, loop, clip, screw clamp, clamps, magnet, hook-and-loop fastener, holding plate, click-on connector or screw connection.

3. The holding element according to claim 1, characterized in that
the first holding unit (1) and the fastening unit (10) are designed to be detachable from each other.

4. The holding element according to claim 1, characterized in that
the holding element consists of an elastic material.

5. The holding element according to claim 1, characterized in that
the spherical ends (4) are connected with the holding fingers (3) in a detachable manner.

6. The holding element according to claim 1, characterized in that
the holding fingers (3) exhibit bulges, having a round, triangular or square cross-section and a straight or curved shape, where the distance of the holding fingers (4) of the first holding unit (1) or the distance of the holding fingers of the second holding unit between each other, starting from the connecting point (2), first becomes larger and then remains the same and then becomes smaller again.

7. The holding element according to claim 1, characterized in that
the first holding unit (1) and the second holding unit of a holding element will each have the same number of holding fingers (3) or will each have a different number of holding fingers (3) with respect to one another and where the length of the holding fingers in the first holding unit (1) or the length of the holding fingers in the second holding unit is equal but the length of the holding fingers in the first holding unit differs from the length of the holding fingers in the second holding unit.

8. The holding element according to claim 1, characterized in that
the holding fingers (3) of the first holding unit (1) or of the second holding unit are arranged on the same plane or on different planes.

\* \* \* \* \*